United States Patent [19]
Becker et al.

[11] Patent Number: 6,047,318
[45] Date of Patent: Apr. 4, 2000

[54] METHOD OF DOWNLOADING JAVA BEAN FILES IN A NETWORK

[75] Inventors: Craig Henry Becker, Austin; William Mitchell Edwards, Pflugerville, both of Tex.

[73] Assignee: International Business Machines Corporation, Armonk, N.Y.

[21] Appl. No.: 08/974,415

[22] Filed: Nov. 19, 1997

[51] Int. Cl.[7] .................................................. G06F 13/00
[52] U.S. Cl. ......................... 709/217; 709/219; 709/225
[58] Field of Search ................................. 709/200, 201, 709/202, 203, 213, 214, 215, 216, 217, 218, 219, 300, 302, 303, 223, 225; 707/10, 100, 102, 103, 104, 200

[56] References Cited

U.S. PATENT DOCUMENTS

| | | | |
|---|---|---|---|
| 4,999,766 | 3/1991 | Peters et al. ............................... | 707/10 |
| 5,457,797 | 10/1995 | Butterworth et al. ................... | 709/302 |
| 5,548,745 | 8/1996 | Egan et al. ............................... | 395/500 |
| 5,689,640 | 11/1997 | Okanoue .................................. | 709/221 |
| 5,778,368 | 7/1998 | Hogan et al. ............................. | 707/10 |
| 5,796,952 | 8/1998 | Davis et al. ............................. | 709/224 |

Primary Examiner—Viet D. Vu
Attorney, Agent, or Firm—Volel Emile

[57] ABSTRACT

A method and apparatus of downloading files from a first computer system to a second computer are provided. In a first embodiment, the files are transmitted and stored into a temporary location in the second computer system. After storing the files in the temporary location, the location is opened as a local repository of the transmitted files. In a second embodiment, it is determined whether the transmitted are in one of two formats. If they are in a format that does not require that the files provide a list of all the subfiles that they contain, we determined whether there exists this list. If not the list is created.

12 Claims, 3 Drawing Sheets

METHOD OF DOWNLOADING JAVA BEAN FILES IN A NETWORK

BACKGROUND OF THE INVENTION

1. Field of the Invention

The present invention relates generally to file transfer and, more particularly, to a method of downloading Java beans over the Internet from a remote server to a local client system.

2. Description of the Related Art

Java is a platform independent and a fully object oriented programming language. Java is also flexible and easy to use on any operating system. Due to these attributes, Java is often used to program applications made available over the Internet. Java includes a wealth of frameworks, class libraries and a new programming environment intended to greatly enhance application software development on the internet. This new programming environment can be referred to as the "Java bean".

A "Java bean" or bean is the most extensively used API (application program interface) in Java programming. It is the tool that provides application developers with the framework for reusable, embeddable, modular software components. The bean is the basic object unit; it can range from a simple individual component object to an extensive combination of objects providing a whole application program. That is, the Java bean model provides commonality and interoperability with other beans to form a combination component or a composite bean. These beans and/or composite beans can be GUI (graphics user interface) widgets, non-visual functions, services, applets and more full-scale applications. Java beans and their common properties and functions are described in detail in the text, "*Java in a Nutshell*", 2nd. Edition by David Flanagan, published by O'Reilly and Assoc. Inc., California, 1997.

Developers have routinely downloaded Java beans over the internet from remote servers to local client systems. However, several steps had to be followed before the beans were actually used. For example, the developers had to (1) download the beans, (2) instantiate the class or classes that are in the beans and (3) use the beans within their own program.

Thus, a need exists to simplify the manner of using beans resident on a remote server in a program at a local client system.

SUMMARY OF THE INVENTION

The need in the art is addressed by the present invention. The present invention provides a method and apparatus for downloading files from a first computer system to a second computer. In a first embodiment, the files are transmitted and stored into a temporary location in the second computer system. After storing the files in the temporary location, the location is opened as a local repository of the transmitted files. In a second embodiment, it is determined whether the transmitted are in one of two formats. If they are in a format that does not require that the files provide a list of all the subfiles that they contain, we determined whether there exists this list. If not the list is created.

DESCRIPTION OF THE INVENTION

As alluded to before, a bean consists of one or more files, each containing compiled Java code or data. It is a software component that can be visually manipulated in development environments. The present invention allows a developer to choose from a catalogue beans to be used in a Java-based software program. For instance, the beans may be organized into an amalgam of different nifty buttons that can be chosen by a developer. Once a button is chosen with the click of a mouse, the local or client system contacts a remote server. This remote server may be regarded as a bean warehouse. Each button or bean has a distinct identifier (i.e., a 32-digit hexadecimal string). Using the identifier, the remote server can check to see whether it has the chosen bean. If yes, it will provide it to the client; otherwise, it checks other servers (i.e., other warehouses) for the chosen bean in order to provide to the requesting client. Once the bean is received by the client, it is automatically instantiated in accordance with the method disclosed in application Ser. No. 08/977,296, filed on Nov. 24, 1997, the disclosure of which is hereby incorporated by reference. Once instantiated, the beans can be manipulated (i.e. examined, changed, deleted, modified etc.).

Figure 1:
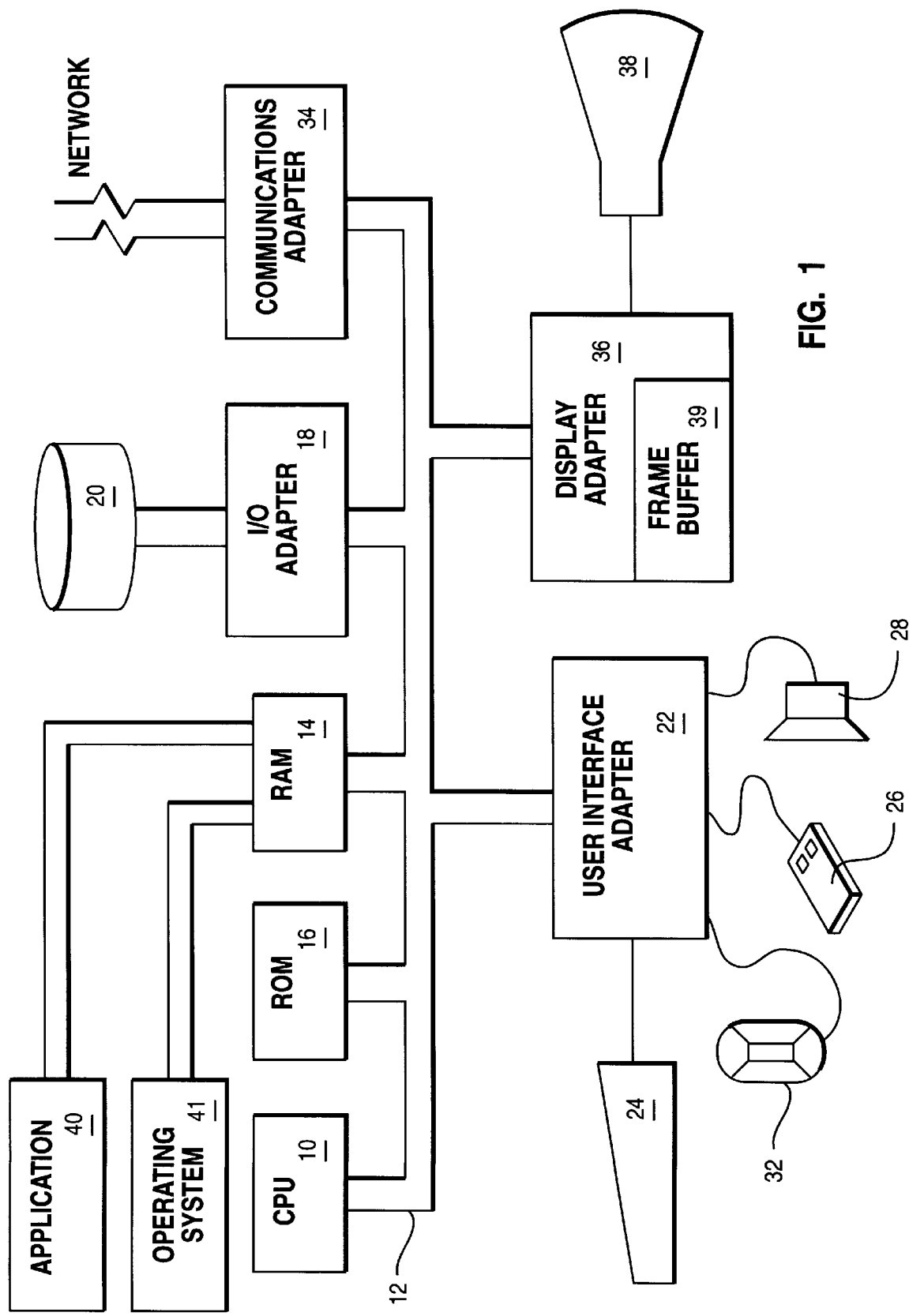
FIG. 1 is a depiction of a client system as used in the present invention.

Referring to FIG. 1, there is depicted a workstation or client system, having a central processing unit (CPU) 10, such as a conventional microprocessor, and a number of other units interconnected via a bus 12. The client system has a random access memory (RAM) 14, a read only memory (ROM) 16, an input/output (I/O) adapter 18 for connecting peripheral devices such as floppy disk unit 20 to the bus, a user interface adapter 22 for connecting a keyboard 24, a mouse 26, a speaker 28, a microphone 32, and/or other user interface devices such as a touch screen device (not shown) to the bus. The client system also has a communication adapter 34 for connecting the client system to a communication network. Finally, the client system has a display adapter 36, including a frame buffer 39, for connecting the bus to a display device 38.

Figure 2:
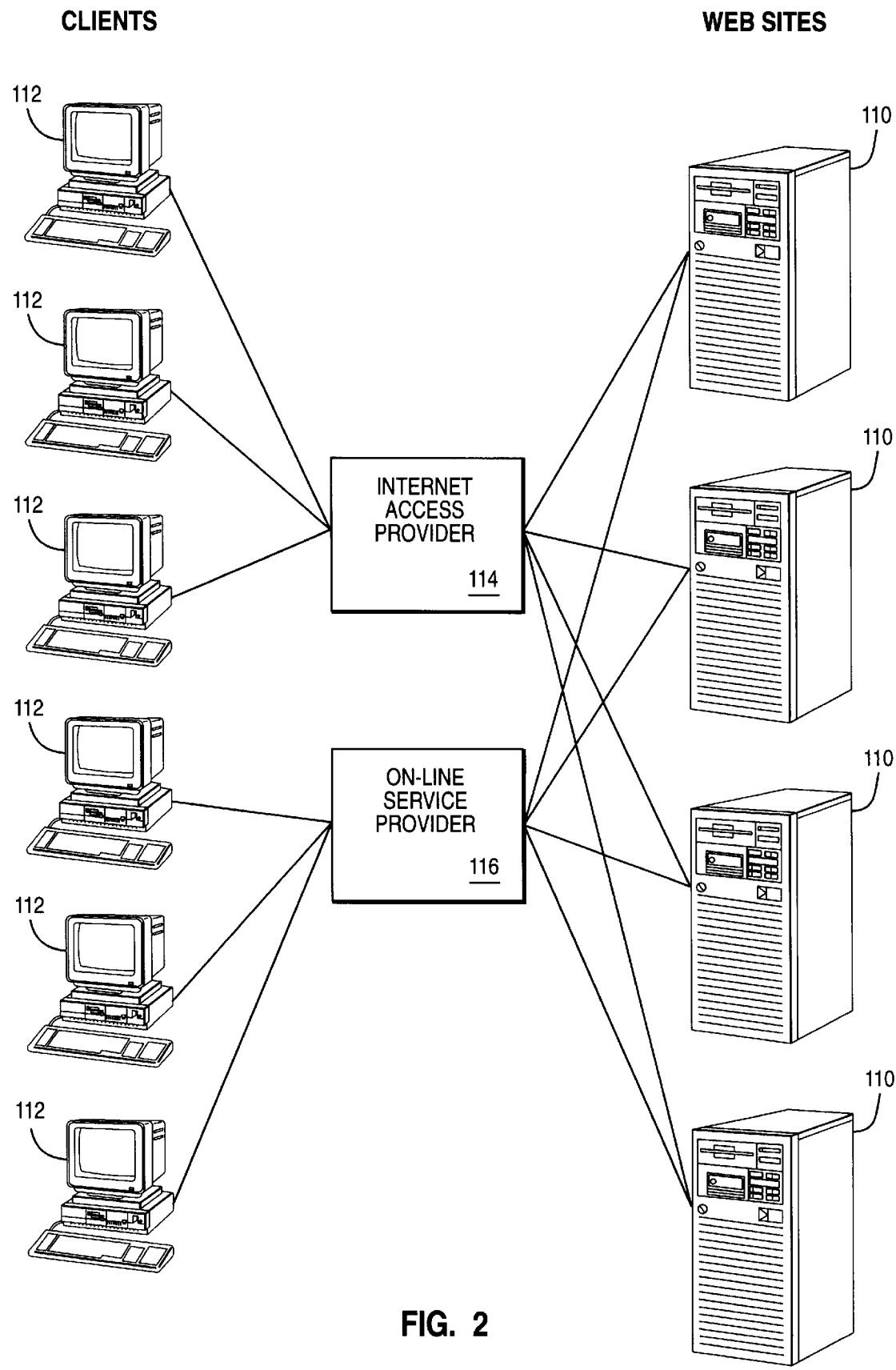
FIG. 2 illustrates a communication network based on a client-server model typically utilized in the Internet.

FIG. 2 illustrates a communication network based on a client-server model typically utilized in the Internet. Conceptually, the Internet comprises a large network of sites 110 that are accessible by client systems 112. Each client 112 is a user/developer. Clients 112 access the Internet through either a private Internet access provider 114 (i.e., Internet America™) or an on-line service provider 116 (i.e., America On-line™, Prodigy etc.) Access provider 112 and service provider 116 will hereinafter be collectively referred to as web servers. Each of the clients 112 may run a web browser which is a known software tool used to access sites 110 via the web servers 114 and 116.

Figure 3:
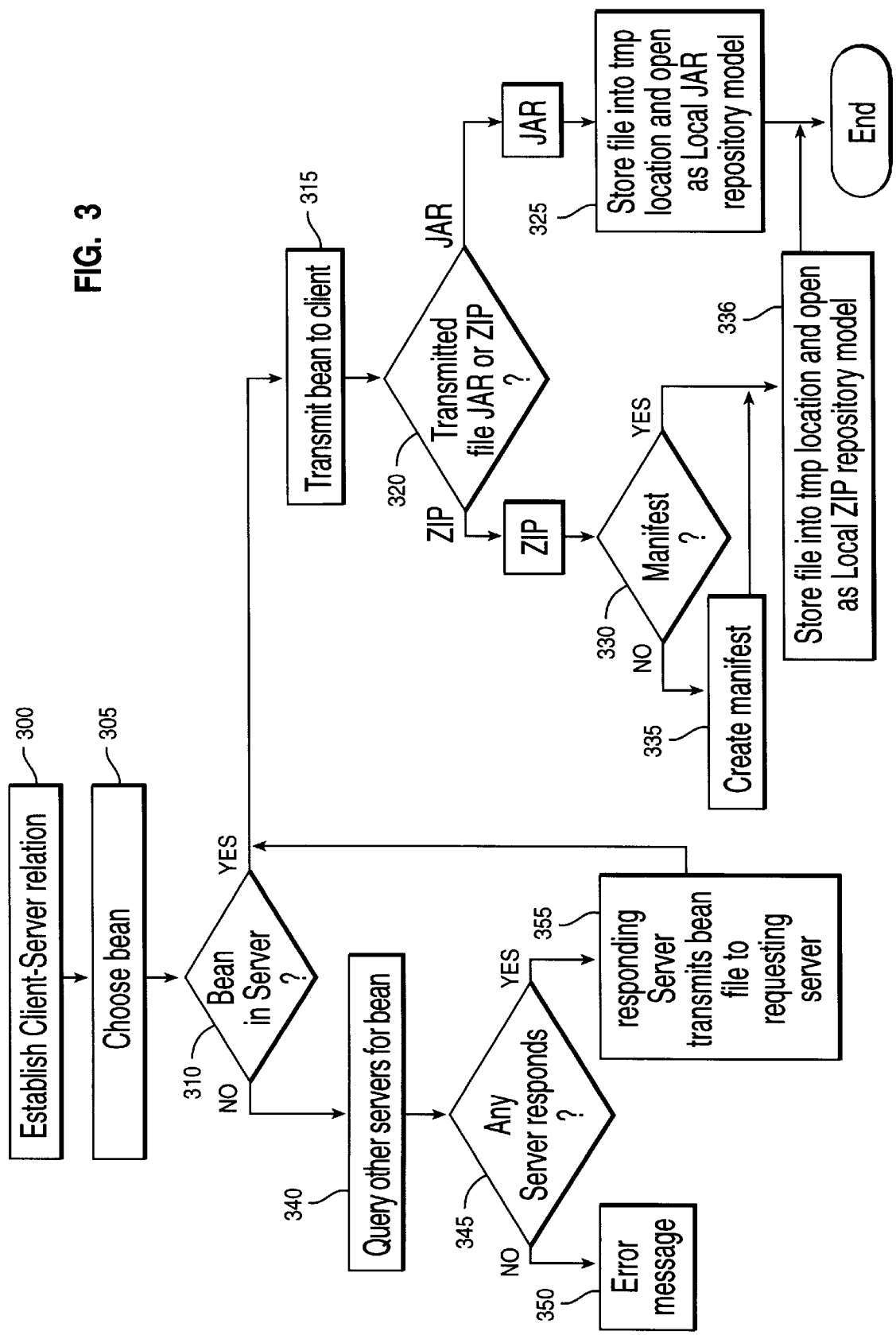
FIG. 3 is a flow chart of a novel method of downloading a Java bean.

FIG. 3 is a flow chart of a method of downloading Java bean files. At step 300, a client-server relationship is established. At step 305 a Java bean is chosen from a bean catalogue. The bean catalogue can either reside in each of the clients 112 or in one of the servers 110. In this particular embodiment, the bean catalogue resides in one of the servers 110. Each client can access this particular server by using the server's network path which may be identified by a uniform resource locator (URL). URLs are utilized to specify a link from a user to a server or a file. Upon specification of the link, the client 112 makes a Transmission Control Protocol/Internet Protocol (TCP/IP) request to the server containing the catalogue and receives a web page in return. The web page itself may be the catalogue. That is, on the web page may be listed textually or through the aid of icons (or graphic symbols) the different warehoused items. To download the item, the user/developer has to select the item to be downloaded and confirm his/her intention to do so.

At step 310, it is determined whether the chosen bean resides in the primary server. The primary server is the server to which the client is directly connected. This server can also be a warehouse. Note that the distinct identifier of the beans may be their URL or an indication that the item is a warehoused item. In this particular embodiment, the catalogue is within a server warehouse and the beans are identified by a warehoused item identification.

If the file representing the chosen bean is in the primary server, the file is transmitted to the client (step 315). Files representing composite beans are ordinarily put in a JAR (Java Archive) file or a ZIP file. A JAR or ZIP file is a file format that is used to aggregate many files (especially related files) into one to facilitate transmission.

A JAR file always contains within it a manifest file.

The manifest file has a list of all the Java bean subelement files (i.e., class, audio, image, data, and varying amounts of structural element relating to the subelement files). A ZIP file, on the other hand, may or may not include a manifest file.

At step 320, it is determined whether the file transmitted is a JAR file or a ZIP file. If it is a JAR file, the file is stored into a temporary location on the client system. This temporary JAR file is then opened as a local JAR repository model (step 325). A repository model is a dynamic data structure that contains elements called managedBeans. The data in the Java bean subelement files is read, parsed and placed into these managedBean elements. The managedBeans repository model subsystem is disclosed in patent application Ser. No. 08/968,719, filed on Nov. 12, 1997) the disclosure of which is hereby incorporated by reference.

If the transmitted file is a ZIP file, it is determined whether there is a manifest file (step 330). If there is not a manifest file, one is created by using a heuristic method of guessing Java bean names. This method is described in patent application Ser. No. 08/974,838, filed Nov. 20, 1997, the disclosure of which is hereby incorporated by reference (step 335). After creating the manifest or if there is a manifest, the ZIP file is stored into a temporary location on the client system. This temporary file is opened as a local ZIP repository model (step 336).

At step 310, if the file(s) representing the bean are not in the server containing the catalogue, the server queries the other servers to determine whether the file(s) reside in any one of them (steps 340 and 345). If none of the servers respond as containing the file(s) representing the chosen bean, an error message (i.e., files could not be found) is sent to the client by the primary server (step 350). If one of the other servers indicates that it has the bean file(s), it is requested to transmit the file(s) to the primary server (step 355). The primary server then transmits the bean file(s) to the client at step 315. The process then continues to step 325.

Note that in this case, if the catalogue items were identified by their URLs, the primary server would know exactly which server to contact to receive the file(s) of the chosen bean.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of downloading files from a first computer system to a second computer system comprising the steps of:
    transmitting said files from said first computer system to said second computer system;
    determining whether there exists a list of subfiles contained in said transmitted file;
    creating said list of files if it is determined that said list of files is not contained in said transmitted file;
    distinguishing between a first file format and a second file format;
    storing said files into a temporary location in said second computer system; and
    opening said temporary location as a local repository of said transmitted files.

2. The method of claim 1 wherein said first file format and said second file format are a JAR file format and a ZIP file format, respectively.

3. The method of claim 1 wherein if said first computer system does not contain said files, said files are requested from any other computer system that may contain said files.

4. The method of claim 3 wherein said files are transmitted from any other computer that may contain said files to said first computer system before being downloaded to said second computer system.

5. An apparatus for downloading files from a first computer system to a second computer system comprising:
    means for transmitting said files from said first computer system to said second computer system;
    means for determining whether there exists a list of subfiles contained in said transmitted file;
    means for creating said list of files if it is determined that said list of files is not contained in said transmitted file;
    means for distinguishing between a first file format and a second file format;
    means for storing said files into a temporary location in said second computer system; and
    means for opening said temporary location as a local repository of said transmitted files.

6. The apparatus of claim 5 wherein said first file format and said second file format are a JAR file format and a ZIP file format, respectively.

7. The apparatus of claim 5 wherein if said first computer system does not contain said files, said files are requested from any other computer system that may contain said files.

8. The apparatus of claim 7 wherein said files are transmitted from any other computer that may contain said files to said first computer system before being downloaded to said second computer system.

9. A computer program product for use with a computer system for downloading files from a first computer system to a second computer system comprising:
    computer readable program code means for transmitting said files from said first computer system to said second computer system;
    computer readable program code means for determining whether there exists a list of subfiles contained in said transmitted file;
    computer readable program code means for creating said list of files if it is determined that said list of files is not contained in said transmitted file;
    computer readable program code means for distinguishing between a first file format and a second file format;
    computer readable program code means for storing said files into a temporary location in said second computer system; and computer readable program code means for opening said temporary location as a local repository of said transmitted files.

10. The computer program product of claim 9 wherein said first file format and said second file format are a JAR file format and a ZIP file format, respectively.

11. The computer program product of claim 9 wherein if said first computer system does not contain said files, said files are requested from any other computer system that may contain said files.

12. The computer program product of claim 11 wherein said files are transmitted from any other computer that may contain said files to said first computer system before being downloaded to said second computer system.

* * * * *